(12) United States Patent
Reddy

(10) Patent No.: US 6,278,819 B1
(45) Date of Patent: Aug. 21, 2001

(54) METHOD AND APPARATUS FOR MANUFACTURING OPTICAL FIBER COMPONENTS

(75) Inventor: K. Pattabhirami Reddy, Corning, NY (US)

(73) Assignee: Corning Incorporated, Cornign, NY (US)

(*) Notice: Subject to any disclaimer, the term of this patent is extended or adjusted under 35 U.S.C. 154(b) by 0 days.

(21) Appl. No.: 09/417,261

(22) Filed: Oct. 12, 1999

(51) Int. Cl.[7] .................................................... G02B 6/34
(52) U.S. Cl. ............................................................. 385/37
(58) Field of Search ............................................ 385/37, 10

(56) References Cited

U.S. PATENT DOCUMENTS

| | | | |
|---|---|---|---|
| 5,218,655 | * 6/1993 | Mizrahi | 385/39 |
| 5,841,920 | * 11/1998 | Lemaire et al. | 385/37 |
| 5,949,934 | * 9/1999 | Shima et al. | 385/37 |
| 6,137,932 | * 10/2000 | Kim et al. | 385/37 |

* cited by examiner

Primary Examiner—Frank G. Font
Assistant Examiner—Michael P. Mooney
(74) Attorney, Agent, or Firm—Price, Heneveld, Cooper, DeWitt & Litton

(57) ABSTRACT

A method and apparatus for manufacturing fiber-optic devices to precise CWL specifications by plasticizing one attachment end of a mounted fiber-optic device and finely adjusting the fiber tension while monitoring the CWL. In one embodiment, the method of manufacturing an optical fiber component to a precise CWL includes the step of affixing the ends of a fiber component under tension to a substrate to approximate a desired CWL. Subsequently, one end of the fiber is gripped with a movable clamp and the adjacent attachment plasticized while the tension on the fiber is adjusted until the CWL is within a desired range. The attachment is rehardened while the tension on the fiber is maintained by the movable clamp.

18 Claims, 3 Drawing Sheets

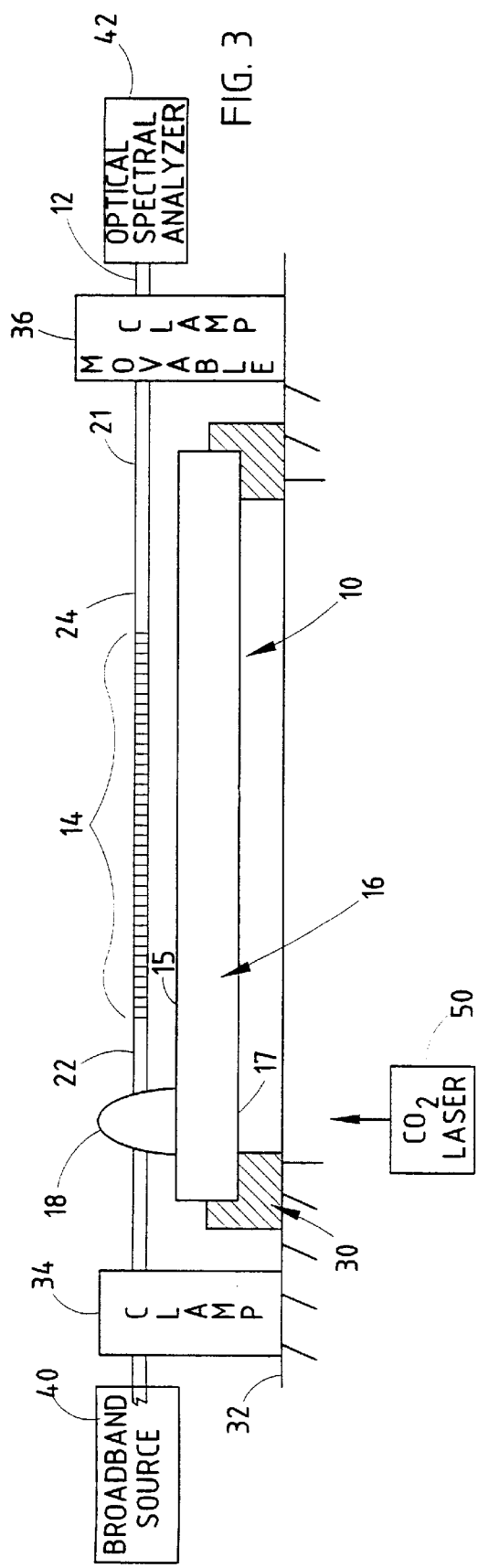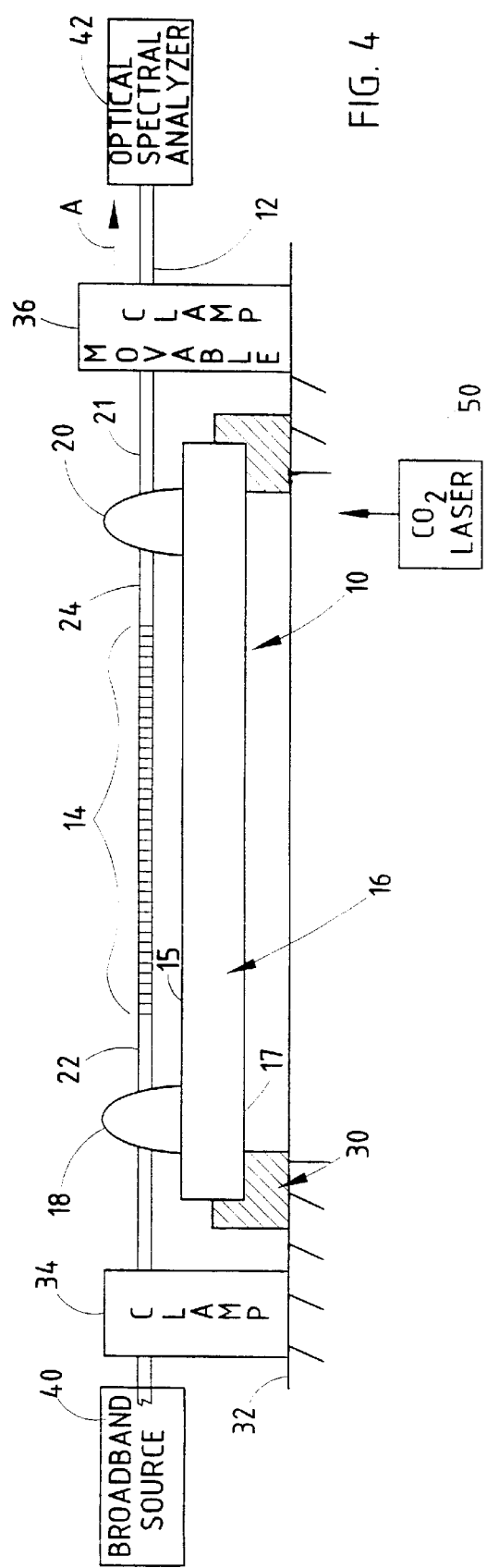

METHOD AND APPARATUS FOR MANUFACTURING OPTICAL FIBER COMPONENTS

BACKGROUND OF INVENTION

1. Field of the Invention

The present invention relates to relates generally to the manufacturing of optical fiber components and particularly to a method and apparatus for precisely controlling the optical path length of an optical fiber component.

2. Technical Background

Optical fiber based devices are widely utilized as components for optical communications due to their relatively low insertion loss and low cost. Foremost of optical fiber components are fiber Bragg gratings (FBG) which are typically made by ultraviolet (UV) wavelength energy exposure. Once an FBG is mounted to a substrate and annealed, it is no longer photosensitive and cannot be further tuned. Thus, it is necessary to empirically predict the final frequency of such a grating which can lead to a significant error resulting in gratings which are not within specifications. Due to the uncertainty of the wavelength shift resulting from the attachment process and annealing, the center wavelength (CWL) of a packaged fiber Bragg grating can vary as much as +/−60 picometers from the desired CWL. Such a wavelength error combined with a wavelength drift of, for example, distributed feedback lasers, which may be from +/−50 picometers, and the residual temperature dependence of +/−20 picometers imposes a highly stringent requirement on the design of, for example, 50 GHz fiber Bragg gratings.

A typical attachment process for a fiber Bragg grating is to bond one end of the fiber to a substrate, tension the fiber by an empirically determined amount, and bonding the opposite end of the fiber. FIG. 1 shows the distribution of the CWL for samples manufactured by this process. Since the total available margin is only +/−40 picometers, only a fraction (20% to 30%) of the gratings can be employed.

Precise control of optically tuned fiber-optic devices with a CWL within less than +/−15 picometers is desired to minimize cross-talk between adjacent communication channels of a system. In order to maintain the CWL of a tuned fiber-optic device, such as a fiber Bragg grating, a β-eucryptite substrate has been employed having a coefficient of temperature expansion of −7.5 ppm/° C. to compensate for the refractive index change of the fiber with temperature variations. With such substrates, the CWL shift due to temperature changes over a range of from 0° C. to 70° C. has been reduced to +/−15 pm. Thus, although the substrate selection has improved the stability of the device once manufactured, there remains a need to manufacture devices such as fiber Bragg gratings or other optically tuned components to a CWL that produces a yield rate for precise CWL devices higher than that previously available with existing manufacturing techniques.

It has been discovered that the variability of the CWL of fiber-optic devices is not a function of the laser power employed in the manufacturing of the devices nor is it a result of the substrate material. Instead, it appears that the variability is inherent in the attachment process and there remains a need, therefore, for a process and system for manufacturing precisely tuned fiber-optic devices.

SUMMARY OF THE INVENTION

The method and apparatus of the present invention achieves the manufacturing of fiber-optic devices to precise CWL specifications by plasticizing one attachment end of a mounted fiber-optic device and finely adjusting the fiber tension while monitoring the CWL.

A method of manufacturing an optical fiber component to a precise CWL includes the step of affixing the ends of a fiber component under tension to a substrate to approximate a desired CWL. Subsequently, one end of the fiber is gripped with a movable clamp and the adjacent attachment plasticized while the tension on the fiber is adjusted until the CWL is within a desired range. The attachment is rehardened while the tension on the fiber is maintained by the movable clamp.

In one embodiment, one end of a fiber is bonded to a negative coefficient of expansion substrate using a glass frit and the opposite end gripped under tension by a movable clamp while the CWL is monitored. The fiber tension is adjusted by moving the clamp until the CWL is about 0.35 nm below the target CWL for 70 mm substrates. Next, a second frit bonds the fiber to the substrate at an opposite end adjacent the movable clamp. The CWL is again checked and, if off more than 10 picometers, the fiber is retensioned by moving the clamp to the previous position, reheating and plasticizing the second frit, and adjusting the clamp while monitoring the CWL until the CWL change equals an amount corresponding to the difference between the first measured CWL and the target CWL. Once cooled, the clamp is released and the final CWL is measured and recorded.

The result of this process produces precisely tuned fiber-optic devices, such as a fiber Bragg grating. Although particularly suitable for manufacturing fiber Bragg gratings, other tunable fiber-optic components likewise can be manufactured using such technique, to precisely control the optical path length of the optical fiber device during manufacturing.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

BRIEF DESCRIPTION OF THE DRAWINGS

FIG. 3 is a schematic, side-elevational view of a fiber Bragg grating and an apparatus for manufacturing the same according to the present invention during a first step in the manufacturing process;

FIG. 4 is a schematic, side-elevational view of the next step in the manufacturing process of the fiber Bragg grating shown in FIG. 2;

DETAILED DESCRIPTION OF THE PREFERRED EMBODIMENT

Figure 1:
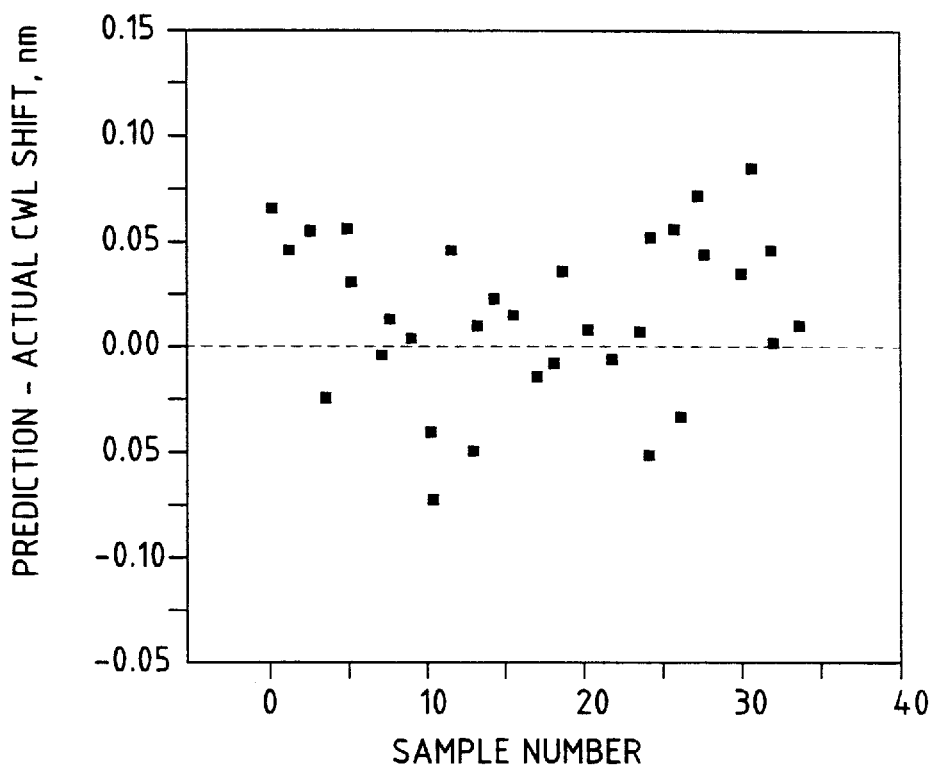
FIG. 1 is a chart illustrating the variations in CWL of fiber Bragg gratings manufactured by conventional techniques.

The chart of FIG. 1 illustrates the CWL shift between predicted CWL and actual CWL for 40 samples made using existing techniques which, as seen, vary between approximately 70 nm below the desired CWL (shown by the dotted line in the chart) to about 75 nm above the desired CWL. The number of samples falling within +/−40 picometers of the desired CWL is relatively small, representing from 20% to 30% of the total number of fiber Bragg gratings made by the conventional empirical process.

Figure 2:
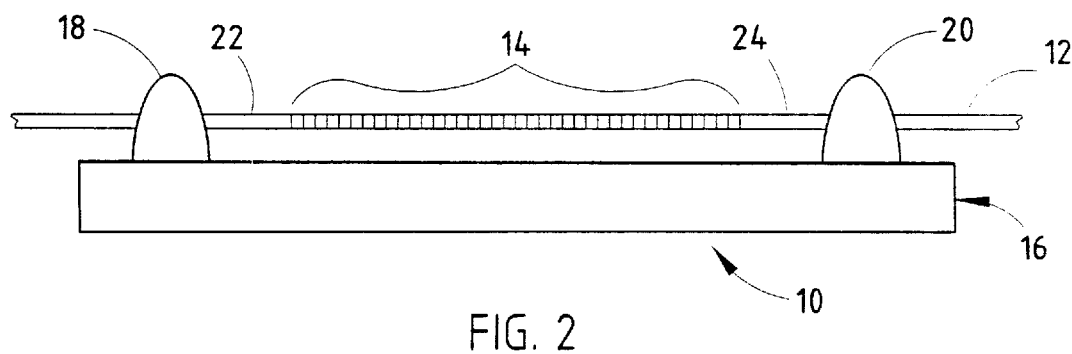
FIG. 2 is an enlarged schematic, side-elevational view of a fiber Bragg grating, shown partially packaged and manufactured according to the present invention.
Figure 5:
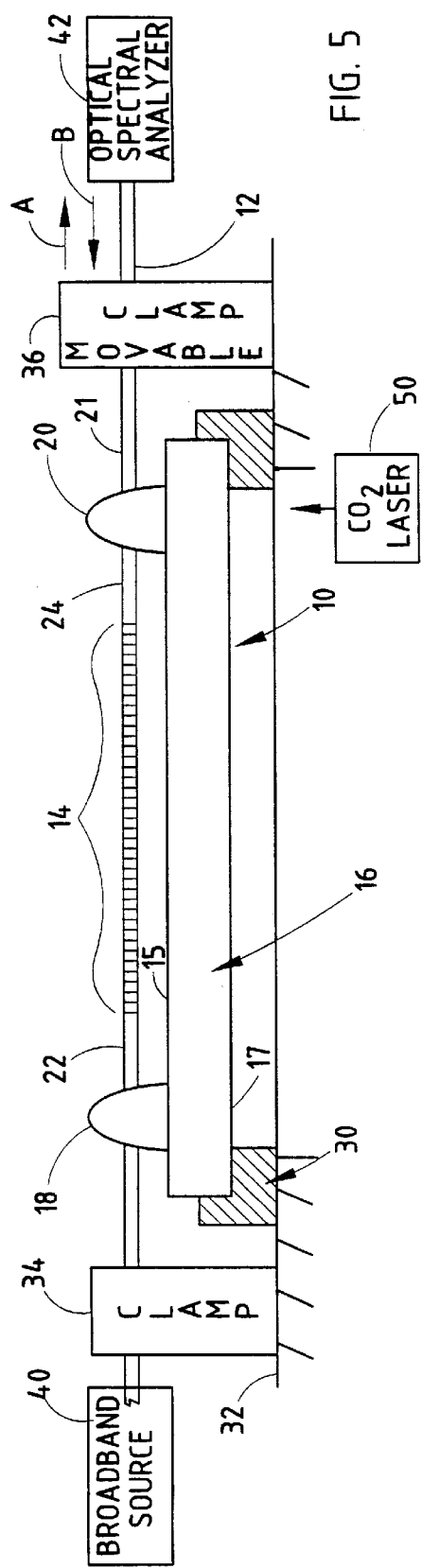
FIG. 5 is a schematic, side-elevational view of a successive step in the manufacturing process of the fiber Bragg grating shown in FIG. 2.
Figure 6:
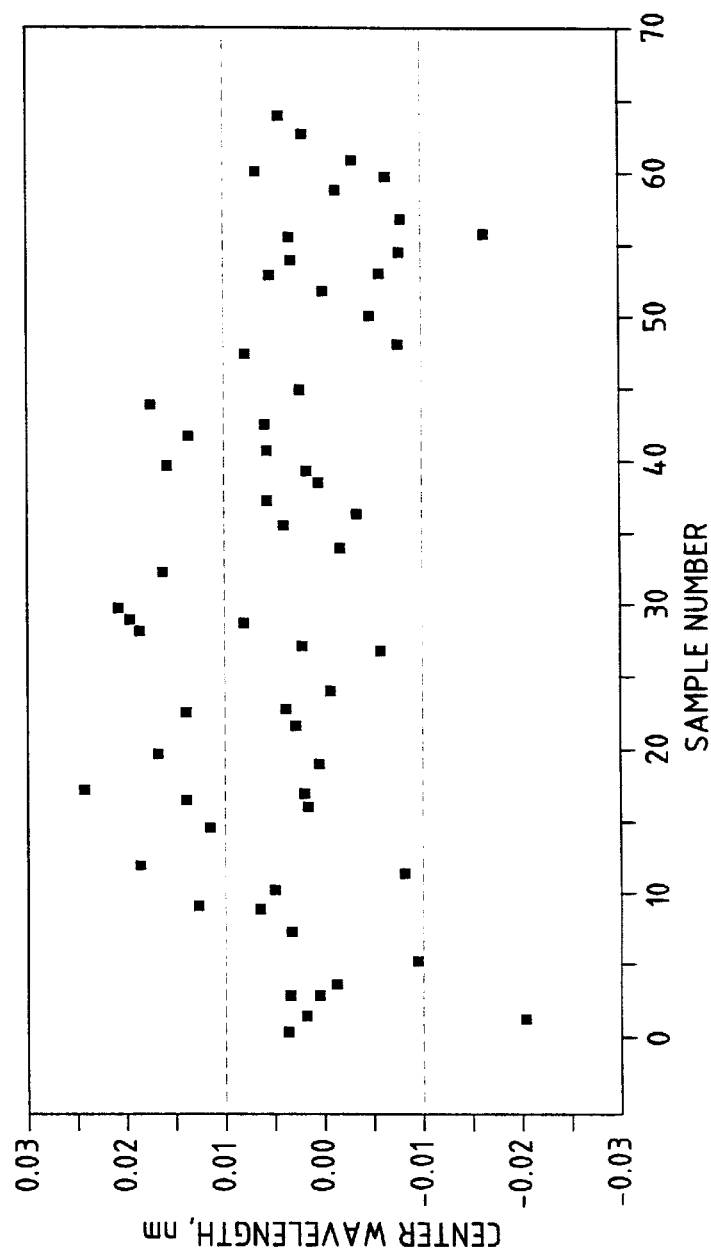
FIG. 6 is a chart illustrating the high yield of precise CWL fiber Bragg gratings resulting from the manufacturing process of the present invention.

In order to improve the yield rate to that shown in FIG. 6, the fiber Bragg grating illustrated in FIG. 2 is manufactured according to the process and apparatus described in connection with FIGS. 3–5. As seen in FIG. 6, a sample of approximately 70 fiber Bragg gratings manufactured according to the present invention yields 80% of gratings falling within +/−10 picometers of the desired CWL. This tolerance band of precisely manufactured gratings is shown between the dotted lines in FIG. 6. Even gratings falling outside the precisely controlled band for the most part fell well within an acceptable range of +/−40 picometers for most applications. Thus, while only very few conventionally manufactured fiber Bragg gratings fall within a +/−10 picometers criteria, more than 80% of the gratings manufactured according to the process of the present invention fell within such tolerance range. The dramatic results achieved by the process and apparatus of the present invention and the resulting fiber-optic component is now described in the context of a fiber Bragg grating with reference to FIGS. 2–5.

A partially packaged fiber Bragg grating assembly 10 is shown in FIG. 2 and includes an optical fiber 12 in which there is imprinted a grating 14 in a central area with a precisely controlled CWL of, for example, 1559.25 nm. The optical fiber 12 is supported on a negative coefficient of expansion substrate 16, such as β-eucryptite, by a pair of spaced glass frits 18 and 20. between the glass frits 18 and 20, there exists fiber end zones 22 and 24 spanning the grating 14. Fiber 12 is mounted to an upper surface 15 of the substrate 16 according to the manufacturing process of the present invention, with grating 14 being conventionally formed utilizing ultraviolet light to selectively change the index of refraction of the core of the fiber 12 in a pattern selected for a wavelength of approximately 1559.25 nm in the example. Other frequency fiber Bragg gratings or other tuned optical devices can be manufactured with the method of the present invention.

In FIG. 3, there is shown the apparatus for manufacturing the fiber Bragg grating 10 according to the present invention. The apparatus includes a holder 30 for the substrate, which holder generally comprises an open rectangular frame into which the substrate 16 is positioned for holding it in place without adding any significant lateral forces to the substrate during the manufacturing process. The holder 30 rests upon a reference surface 32 during the manufacturing process. At one end (shown on the left in FIG. 3) is a fixed clamp 34 holding one end 19 of the fiber 12 in position with respect to the substrate 16. At an opposite end 21 of the fiber 12, there is positioned a movable clamp 36 comprising a clamp mounted on a moveable stage with micrometer adjustment capabilities. Coupled to the left end of the fiber 12, as seen in FIG. 3, is a broad band optical source 40 while coupled to the opposite end of the optical fiber 12 is an optical spectral analyzer 42 to allow the CWL of the grating to be monitored during the manufacturing process.

In one example for a 0.125 nm fiber during the first step of manufacturing, a 5 gram load is placed on the fiber. Next, a frit paste 18 is applied to the area adjacent end zone 22 of fiber 12 and a beam from a $CO_2$ laser 50 is directed to the undersurface 17 of substrate 16 directly under frit paste 18, heating the undersurface of the substrate to a temperature of between 800° C. to 900° C. and the upper surface 15 onto which the frit past has been applied to approximately 500° C. to 600° C., fusing the frit to the left end of fiber 12 and to the substrate. The substrate is then allowed to cool for approximately five minutes and the CWL is measured utilizing the optical spectral analyzer 42.

Next, the stage for movable clamp 36 is moved to the right in the direction shown by arrow A in FIG. 4 while watching the CWL from analyzer 42 until the CWL is at a predetermined relationship to the desired final CWL. For a negative temperature coefficient 70 mm substrate, such as β-eucryptite employed in the present invention, typically the strain placed upon the fiber 12 by movable clamp 36 places the CWL below the desired CWL to account for substrate expansion during the cooling of the substrate. In this example, the selected CWL is 0.35 nm below the target wavelength.

A second bead 20 of glass frit paste is applied to the right end of the fiber 12, as shown in FIG. 4, and the $CO_2$, laser 50 is positioned under the frit 20 to again heat the under surface of substrate 16 to from 800° C. to 900° C. and the top surface to from 500° C. to 600° C. for fusing the glass frit and anchoring end 24 of fiber 12 to the substrate 16. During the fusing process, the CWL is measured twenty seconds after the top hold segment (the twenty second CWL value) while the clamp 36 is held in position. Substrate 16 is then allowed to cool for approximately five minutes, after which the movable clamp releases the tension on the end 21 of fiber 12, and, again, the CWL is tested. Typically, the CWL will at this stage be higher or lower than the target CWL by an amount greater than 10 picometers. For precise fiber Bragg gratings of the type which can be commercially manufactured utilizing the present invention, 10 picometers above or below the CWL is the tolerance limit desired for such precise gratings.

With clamp 34 continuing to maintain the left end of the fiber anchored together with frit 18, movable clamp 36 is moved to the same position as before the load was released to retension the fiber while the second frit 20 is reheated by laser 50. When the heating has reached the top hold segment with the upper surface of the substrate 16 at about 500° C. to 600° C., depending upon the direction of the measured CWL, the movable clamp 36 is either moved in a direction indicated by arrow A to the right in FIG. 5 to increase the tension and thereby increase the CWL or to the left as indicated by arrow B in FIG. 5 to decrease the tension in the fiber 12, thereby decreasing the CWL. If, for example, the CWL is 40 picometers below the target CWL after the first attachment, upon reheating frit 20, the movable clamp is moved in a direction indicated by arrow A while monitoring the CWL through analyzer 42 until the twenty second CWL value is increased by 40 picometers.

Movement of movable clamp 36 during the fine tuning of the grating, while observing the CWL, allows real time control of the manufacturing of the grating 10, and, when at the desired changed twenty second CWL, the clamp 36 holds the fiber 12 stationary for a five minute cooling period of the substrate 16. The final CWL is then recorded and typically falls well within the +/−10 picometers criteria, with over 80% of samples tested, as shown by FIG. 6, falling within such range. A strain relief epoxy is placed over the ends of fiber 12 adjacent the outside edges of frits 18 and 20 on the substrate, and the substrate removed from holder 30.

Subsequently, the partially assembled grating is finally packaged in a conventional process to complete the manufacture of the optical fiber device.

Although the preferred embodiment of the invention is employed to manufacture a fiber Bragg grating utilizing glass frits for anchoring the gratings to a negative coefficient substrate, other material for anchoring a glass fiber to other substrates can also be employed. Thus, any anchoring material which can be plasticized after an initial estimated manufacturing CWL has been tested can be employed for manufacturing an optical device, such as a fiber Bragg grating, employing the technique of the present invention. Further, the method and apparatus of the present invention can be employed to manufacture any fiber-optic device requiring precise tuning.

It will become apparent to those skilled in the art that various modifications to the preferred embodiment of the invention as described herein can be made without departing from the spirit or scope of the invention as defined by the appended claims.

The invention claimed is:

1. A method of manufacturing an optical fiber component comprising the steps of:
   providing an optical fiber having a tunable element;
   providing a substrate for the optical fiber;
   anchoring one end of the fiber to the substrate;
   tensioning the fiber while monitoring the center wavelength of the tunable element formed in the fiber to a predetermined center wavelength;
   anchoring an opposite end of the fiber to the substrate;
   measuring the center wavelength of the resulting tunable element;
   plasticizing one of the anchored ends while adjusting the tension on the fiber to change the monitored center wavelength an amount selected to reach a target center wavelength; and
   hardening the one anchor point.

2. The method of claim 1 wherein the monitoring step comprises applying a broadband optical signal at one end of the fiber and coupling an optical spectral analyzer to the opposite end of the fiber.

3. The method of claim 1 wherein the anchoring step comprises supplying a glass frit paste and applying the glass frit paste to the fiber and heating and subsequently cooling the substrate to fuse the frit paste to the fiber and substrate to form a frit.

4. The method of claim 3 wherein the plasticizing step comprises reheating one of the anchor points to a temperature to allow the fiber tension to be adjusted.

5. The method of claim 4 wherein the plasticizing step comprises heating the frit to a temperature of from about 500° C. to about 600° C.

6. The method of claim 1 wherein said tensioning steps comprise clamping the opposite end of the optical fiber in a clamp movable in a direction toward and away from the one end of the optical fiber.

7. The method of claim 1 wherein the tunable element of the optical fiber is a grating.

8. The method of claim 1 wherein the fiber optic component is a fiber Bragg grating.

9. An apparatus for manufacturing a precise fiber Bragg grating comprising:
   a holder for a substrate;
   a first clamp for clamping one end of a fiber during its attachment to the substrate held by the holder;
   a movable clamp positioned adjacent an end of the holder opposite the first clamp, the movable clamp adjustable to adjust the tension in a fiber mounted to the substrate;
   a broad band source of radiation for coupling to an input end of the fiber;
   a structure for selectively anchoring opposite ends of the fiber onto said substrate during first and second adjustments of the movable clamp to achieve a target center wavelength for a fiber Bragg grating mounted to a substrate, wherein the structure for anchoring opposite ends of the fiber includes a laser for heating and reheating a glass frit employed to anchor the optical fiber to the substrate; and
   an optical analyzer for coupling to an opposite end of said fiber to monitor the center wavelength of the grating during the first and second adjustments of the movable clamp.

10. The apparatus of claim 9 wherein the laser is a $CO_2$ laser.

11. A fiber Bragg grating made by the steps of:
    anchoring one end of a fiber Bragg grating to a substrate;
    tensioning the fiber while monitoring the center wavelength of the grating to a predetermined center wavelength;
    anchoring an opposite end of the fiber to the substrate;
    measuring the center wavelength of the grating; and
    plasticizing one of the anchored ends of the grating by heating the end with a laser beam while adjusting the tension on the fiber to change the monitored center wavelength an amount selected to reach a target center wavelength; and
    hardening the one anchor point.

12. A method of manufacturing a fiber Bragg grating comprising the steps of:
    mounting an optical fiber having a grating onto a substrate;
    measuring the center wavelength of the resulting grating;
    plasticizing one of the mounted ends of the grating while adjusting the tension on the fiber while monitoring the center wavelength until a target center wavelength is detected; and
    hardening the one end.

13. The method of claim 12 wherein the mounting step comprises supplying a glass frit paste and applying the glass frit paste to the fiber and heating and subsequently cooling the substrate to fuse the frit paste to the fiber and substrate to form a frit.

14. The method of claim 13 wherein the plasticizing step comprises reheating one of the frits to a temperature to allow the fiber tension to be adjusted.

15. The method of claim 14 wherein the plasticizing step comprises heating the frit to a temperature of from about 500° C. to about 600° C.

16. The method of claim 12 wherein said adjusting step comprises clamping an end of the optical fiber in a clamp movable in a direction toward and away from the opposite end of the optical fiber.

17. The method of claim 16 and further including supplying a glass frit paste and applying the frit paste to opposite ends of the fiber and heating and subsequently cooling the frit paste to form frits at opposite ends of the fiber, and wherein the plasticizing step comprises reheating one of the frits to a temperature to allow the fiber tension to be adjusted.

18. The method of claim 12 wherein the monitoring step comprises applying a broadband optical signal at one end of the fiber and coupling an optical spectral analyzer to the opposite end of the fiber.

* * * * *

UNITED STATES PATENT AND TRADEMARK OFFICE
CERTIFICATE OF CORRECTION

PATENT NO. : 6,278,819 B1
DATED : August 21, 2001
INVENTOR(S) : Reddy

Page 1 of 1

It is certified that error appears in the above-identified patent and that said Letters Patent is hereby corrected as shown below:

Title page,
Assignee, "Cornign, NY" should be -- Corning, NY --.

Column 1,
Line 8, delete "relates to".
Line 49, "0°" should be -- 0° --.

Column 3,
Line 40, "between" should be -- Between --.

Column 4,
Line 1, "0.125 nm" should be -- 0.125 mm --.
Line 4, "C0$_2$" should read -- CO$_2$ --.
Line 8, "past" should be -- paste --.

Signed and Sealed this

Twenty-third Day of April, 2002

Attest:

Attesting Officer

JAMES E. ROGAN
*Director of the United States Patent and Trademark Office*